US012686331B2

(12) United States Patent
Erler et al.

(10) Patent No.: US 12,686,331 B2
(45) Date of Patent: Jul. 21, 2026

(54) HOLOGRAPHIC ENTRY LIGHT IN A DOOR FRAME

(71) Applicant: Carl Zeiss Jena GmbH, Jena (DE)

(72) Inventors: Christoph Erler, Jena (DE); Siemen Kuehl, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 382 days.

(21) Appl. No.: 18/275,211

(22) PCT Filed: Jan. 24, 2022

(86) PCT No.: PCT/EP2022/051423
§ 371 (c)(1),
(2) Date: Jul. 31, 2023

(87) PCT Pub. No.: WO2022/161888
PCT Pub. Date: Aug. 4, 2022

(65) Prior Publication Data
US 2024/0308424 A1 Sep. 19, 2024

(30) Foreign Application Priority Data

Feb. 1, 2021 (DE) .......................... 102021200896.8
Jul. 15, 2021 (DE) .......................... 102021207573.8

(51) Int. Cl.
*B60Q 3/217* (2017.01)
*B60Q 1/00* (2006.01)
(Continued)

(52) U.S. Cl.
CPC ........... *B60Q 3/217* (2017.02); *B60Q 1/0005* (2013.01); *B60Q 1/32* (2013.01); *B60Q 3/60* (2017.02);
(Continued)

(58) Field of Classification Search
CPC ........... G03H 2223/21; G03H 2222/13; G03H 2001/2231; G03H 1/2205; G03H 1/028;
(Continued)

(56) References Cited

U.S. PATENT DOCUMENTS

| | | | |
|---|---|---|---|
| 2020/0166195 A1 | 5/2020 | Chen | |
| 2020/0183328 A1 | 6/2020 | Studeny et al. | |
| 2020/0377040 A1 | 12/2020 | Dellock et al. | |

FOREIGN PATENT DOCUMENTS

| | | |
|---|---|---|
| DE | 102009020333 A1 | 11/2010 |
| DE | 102010019764 A1 | 11/2011 |
| DE | 102012215165 A1 | 2/2014 |
| DE | 202014101678 U1 | 4/2015 |
| DE | 102015109381 A1 | 1/2016 |

(Continued)

OTHER PUBLICATIONS

FR 2886373 A1 (Year: 2006).*

(Continued)

*Primary Examiner* — Lori Lyjak
(74) *Attorney, Agent, or Firm* — Skaar Ulbrich Macari, P.A.

(57) ABSTRACT

A door frame for a vehicle includes a holographic door sill panel in a lower door frame portion, a suitable lighting assembly in a lateral door frame portion, a holographic door sill panel suitable for such a door frame, as well as a system that is composed of the holographic door sill panel and the lighting assembly and suitable for such a door frame.

19 Claims, 7 Drawing Sheets

(51) Int. Cl.

| | | |
|---|---|---|
| *B60Q 1/32* | (2006.01) |
| *B60Q 3/60* | (2017.01) |
| *B62D 25/04* | (2006.01) |
| *G03H 1/02* | (2006.01) |
| *G03H 1/22* | (2006.01) |

(52) U.S. Cl.
CPC ........... *B62D 25/04* (2013.01); *G03H 1/0248* (2013.01); *G03H 1/028* (2013.01); *G03H 1/2205* (2013.01); *G03H 2001/2231* (2013.01); *G03H 2222/13* (2013.01); *G03H 2223/21* (2013.01)

(58) Field of Classification Search
CPC ........ G03H 1/0248; F21S 43/40; F21S 43/31; F21S 43/26; B62D 25/04; B60Q 3/60; B60Q 3/217; B60Q 1/325; B60Q 1/32; B60Q 1/005
See application file for complete search history.

(56) References Cited

FOREIGN PATENT DOCUMENTS

| | | | |
|---|---|---|---|
| DE | 102014114049 | A1 | 3/2016 |
| DE | 102017200781 | A1 | 7/2018 |
| EP | 2028046 | A1 | 2/2009 |
| EP | 3616994 | A1 | 3/2020 |
| FR | 1518902 | A | 3/1968 |

OTHER PUBLICATIONS

EP 1746243 A2 (Year: 2007).*
DE 102011016408 A1 (Year: 2012).*
The International Search Report rendered by the International Searching Authority for PCT/EP2022/051423, dated May 4, 2022, 3 pages.
International Preliminary Report on Patentability rendered by the International Searching Authority for PCT/EP2022/051423, dated Jul. 31, 2023, 10 pages.

* cited by examiner

HOLOGRAPHIC ENTRY LIGHT IN A DOOR FRAME

PRIORITY

This application claims the priority of German patent application DE 10 2021 200 896.8, filed Feb. 1, 2021, and German patent application DE 10 2021 207 573.8, filed Jul. 15, 2021, and both of which are hereby incorporated herein by reference in their entirety.

FIELD

The invention relates to a door frame for a vehicle, having a holographic door sill strip in a lower door frame section.

BACKGROUND

Vehicles, in particular passenger cars, often have in the lower door frame section in the entry region what is known as a door sill strip, which can be made of plastic and/or metal, for example. The door sill strip can be a somewhat more robust zone of the entry region, which protects it from damage and heavy soiling, for example caused by getting in and out and by weather influences when the door is open. In the case of premium vehicles in particular, the door sill strip is often intended to suggest high quality to the person entering the vehicle by using materials that appear to be of high quality and, for example, by displaying the brand of the vehicle or manufacturer. This aesthetic feature could be further enhanced by using holograms in the region of the door sill strip.

The entry region of a vehicle is also often somewhat elevated for reasons of vehicle safety and protection from the weather. However, this elevation can constitute a dangerous trip hazard when getting in and out, which can be problematic in particular for older people or people with limited vision because it requires a certain level of mobility and often lies outside the visual field. The use of holograms in the region of the door sill strip is also a solution to this problem, since the hologram can generate an image outside, in particular above, the door sill strip, and the visual field is influenceable by the diffraction of the hologram. In this way, the visibility of the door sill strip can be significantly increased and the risk of accidents can be minimized.

One problem when using holograms which are intended to exhibit a certain optical quality and can solve the problems described above is the small amount of space available in the region of the door sill strip. The lower door frame section must be designed to be solid enough to ensure accident safety, and in addition, the door should be as flush as possible with the door frame in this region. There are therefore limits to the illumination of a hologram in the door sill strip that is possible, since an illumination that is part of the door sill strip would require too much space and the electrical connection options in this region are also limited. There is no space in this region to accommodate, for example, LEDs with a lens and maintain a distance from the holographic structure in the door sill strip that is required for illumination. It should also be possible to retrofit vehicles that already have a finished design with holographic door sill strips, which means that there are also strict boundary conditions.

SUMMARY

Provided herein are a door frame, a matching door sill strip, and a matching system without the disadvantages of the prior art. In particular, the door frame increases safety when getting in and out, and also improves the aesthetic appearance of the vehicle without impairing accident safety and increasing the costs and complexity involved in production. Also provided are a door sill strip and a system made up of a door sill strip and an illumination arrangement, which are suitable for use in such a door frame.

Certain embodiments relate to a door frame for a vehicle, having a holographic door sill strip in a lower door frame section, wherein the holographic door sill strip comprises a planar element having a thickness perpendicular to the planar extent of at most 3 mm, which has at least one planar, reflective holographic structure that is configured to generate a holographic light function in a field of view.

Planar preferably means that an extent in the directions that lie in one two-dimensional area is significantly greater than in a direction perpendicular to this area.

The planar extent of the holographic door sill strip can be, for example, between 5 cm and 30 cm, preferably between 10 cm and 25 cm, in the longitudinal direction. In the transverse direction, the extent can be, for example, between 1 cm and 7 cm, preferably between 2 cm and 5 cm. An exemplary extent may be 20 cm in the longitudinal direction and 5 cm in the transverse direction.

The holographic structure is preferably planar and lies in one plane with the two-dimensional area of the holographic door sill strip or parallel thereto.

The planar extent of the holographic structure can lie in the range of the extent of the door sill strip and can preferably be slightly smaller. Preferably, the holographic structure occupies at least 20% of the area of the door sill strip, more preferably at least 30% of the area of the door sill strip, even more preferably at least 40% of the area of the door sill strip, and most preferably at least 50% of the area of the door sill strip. The structure can occupy up to the entire surface of the door sill strip. An exemplary extent may be 20 cm in the longitudinal direction and 5 cm in the transverse direction. An exemplary extent may be 20 cm in the longitudinal direction and 5 cm in the transverse direction. Another exemplary extent of the structure may be 10 cm in the longitudinal direction and 2.2 cm in the transverse direction.

The holographic door sill strip may be transparent to visible light, and in particular may comprise a transparent body.

The holographic structure can be arranged below the upper outer surface of the door sill strip, wherein the door sill strip should be transparent so that illumination light can reach the holographic structure and can in turn reflect out of the door sill strip.

The holographic structure may be located directly at or on the upper outer surface of the door sill strip, in which case there is no need for the door sill strip to be transparent to visible light.

The door sill strip may include a polymer body. The latter can be transparent or opaque to visible light.

The reflective holographic structure is configured in particular to generate a holographic light function when illuminated.

A reflective holographic structure preferably reflects the light that is incident on it, so that the source of the illumination on the viewer's side can be the light function generated by the holographic structure. A reflective holographic structure can advantageously generate the holographic light function (only) with the desired color, even when illuminated with white light, because preferably only specific wavelength ranges satisfy the Bragg condition of the reflective holographic structure.

Field of view and visual field are preferably terms that can be used synonymously.

The reflective holographic structure being configured to generate a holographic light function in a field of view preferably means that the structure diffracts the illumination light in such a way that an image generated can be seen in this field of view.

The field of view is preferably a delimitable volume which is several centimeters (cm), preferably several decimeters (dm) and sometimes even several meters away from the door sill strip.

Such a door frame can easily improve an aesthetic impression of a vehicle and improve safety when getting in and out. It takes up very little space.

In a preferred example embodiment, the holographic structure comprises a volume hologram, which is preferably present as a hologram stack or as a multiplexed hologram. A volume hologram preferably has a thickness of between 5 μm and 200 μm.

Preferably more than one holographic structure is included, e.g. one for a green spectral range, one for a blue spectral range, and one for a red spectral range, in order to generate a white appearing image as the holographic light function.

In a hologram stack, the holographic structures are arranged one above the other, in particular stacked one above the other.

The holographic light function preferably has a single color, wherein color in this context is preferably not necessarily meant in the spectral sense, but in accordance with the color perception of humans. For example, in this sense, not only is red or blue a single color but also white. This may be preferred for aesthetic reasons and to fulfill a warning function.

In an alternative configuration, the holographic structures are present in a single holographic structure, in particular in what is known as a hologram film, in which they were jointly exposed. Such a holographic structure is preferably also referred to as a so-called multiplex hologram.

In a further preferred example embodiment, the holographic structure comprises an embossed hologram.

Embossed holograms are preferably phase holograms. The embossed hologram preferably has indentations that produce a phase difference in the reflected light. These are pressed into the material with a stamp, for example, but can arise from different exposures of suitable material. A phase hologram may preferably also include a spatial modulation of the refractive index, which is produced in silver halide films, for example.

An embossed hologram is preferably a reflective relief pattern; in particular, it can be a metallized, more diffractive relief structure.

The embossed hologram can be a particularly "broadband" hologram, which in turn can be advantageous in some applications, in particular when illumination is performed using daylight and/or ambient light, since the existing light intensity can be better utilized even with weak illumination. In this case, a compromise is preferably made between efficiency and optical quality, or a corresponding image motif is used.

In a further preferred example embodiment, the embossed hologram is included in an element which is configured to predominantly absorb a part of the visible spectrum that is not intended to contribute to the generation of the holographic light function.

The element can be, for example, a colored cover (e.g. red) of an embossed hologram which, for this color, is transparent to red, for example, but substantially or partially absorbs visible spectra at other colors. The cover acts as a filter for the illumination light, which can contain other color ranges in its spectrum, and as a result, the light function generated under the illumination has substantially only the color of the cover. This is a particularly simple and cost-effective solution.

In a further preferred example embodiment, generating a holographic light function comprises displaying a virtual, in-plane and/or real image, in particular a real image at a height of between 0.5 cm and 5 cm above the holographic door sill strip.

This height can produce a good warning function when getting in and out and provides an improved aesthetic impression.

The image can in particular comprise a character or lettering, which in particular appears three-dimensional and preferably appears to be floating above the door sill strip.

In a further preferred example embodiment, the holographic structure, which is preferably an embossed hologram which is included in particular in an element as described above, is configured to generate the holographic light function when illuminated by daylight and/or ambient light, in particular in a range from 420 nm to 700 nm, preferably 620 nm to 700 nm.

Daylight is in particular light generated by the sun during the day, e.g. at noon, for example in summer or in winter.

In particular, ambient light can be generated additionally or exclusively by artificial light sources, for example standard interior illumination in a passenger vehicle.

As already described, the efficiency of the holographic structure must then be given over a broad spectral range, for which in particular the embossed hologram is suitable.

Broadband sunlight would be heavily filtered in the case of a volume hologram designed, for example, for 650 nm+/−5 nm. If the hologram is a volume hologram, then it would preferably be designed only for this 650 nm+/−5 nm and would no longer diffract efficiently at 620 nm, for example.

However, an embossed hologram (preferably also called a relief hologram) would still diffract efficiently at 620 nm, preferably just at a different angle. Connected to a cover described above, which would be made e.g. of plastic and would be applied to the top of the relief hologram aka embossed hologram, the embossed hologram would then always be red (if the cover is red), for example.

Such a door frame does not require its own illumination arrangement for the door sill strip.

In a further preferred example embodiment, the door frame has at least one illumination arrangement that is arranged in at least one lateral door frame section and is configured to illuminate the holographic door sill strip, comprising at least one light source, wherein the holographic structure is configured to generate the holographic light function during the illumination by way of the illumination arrangement.

The illumination arrangement is preferably located above and to the side of the holographic door sill strip, so that illumination takes place at an oblique angle. The illumination arrangement is preferably configured to illuminate the holographic door sill strip, which means first and foremost that, implemented by the orientation, the intensity, the radiation direction and/or the angular spectrum of the illumination light, the holographic entry light is illuminated.

A radiation direction or chief ray direction of the illumination is preferably a direction in which there is a maximum intensity of the light ray or an intensity that is averaged over all directions. The terms preferably refer to the central ray of a beam or its direction. In this case, the radiation direction indicates in particular the direction of the beam. In the case of a collimated beam, the remaining rays of the beam travel substantially parallel to the chief ray direction, and so the chief ray direction is preferably representative of the rays of a beam. In the case of a non-collimated beam, the rays of the beam enclose a defined solid angle, at the center of which the chief ray direction runs.

The centroid angle preferably has an analogous meaning, with the radiation direction from the holographic structure preferably being measured as an angle to the surface normal of the holographic structure.

The holographic structure being configured to generate the holographic light function when illuminated by the illumination arrangement means primarily that the reflective holographic structure is matched to the illumination of the illumination arrangement with respect to the acceptance spectrum and the acceptance angle and the acceptance angular spectrum, so that the spectrum, the illumination angle (or centroid angle) and the angular spectrum of the illumination by way of the illumination arrangement can generate the holographic light function effectively and/or efficiently. The acceptance spectrum and also the acceptance angle and the acceptance angular spectrum of the reflective holographic structure and the spectrum, illumination angle and angular spectrum of the illumination by way of the illumination arrangement advantageously match or overlap. An effective and/or efficient illumination device can thus be provided.

In a further preferred example embodiment, the lateral door frame section is a front lateral door frame section, in particular an extension of an A-pillar toward the vehicle floor or a lower section of the B-pillar.

Front and rear are preferably defined with respect to the direction of travel. In the case of a front door, an extension of an A-pillar toward the vehicle floor is preferably a front lateral door frame section, and in the case of a rear door it is preferably a lower section of the B-pillar. The lateral door frame section is preferably particularly well suitable for accommodating the illumination arrangement. This can be kept very compact and at the same time is visible only when the door is open and is otherwise protected.

In a further preferred example embodiment, the lateral door frame section is a rear lateral door frame section, in particular a lower section of a B-pillar toward the vehicle floor or an extension of a C-pillar toward the vehicle floor. In the case of a front door, a lower section of the B-pillar is preferably a rear lateral door frame section, and in the case of a rear door, it is preferably an extension of a C-pillar toward the vehicle floor. The rear door frame section is advantageous for reduced contamination of the illumination arrangement and easier maintenance.

A further preferred example embodiment comprises two illumination arrangements, with one in each case being comprised in a front lateral door frame section and one in a rear lateral door frame section. In this way, particularly intensive and improved illumination can be realized.

In a preferred example embodiment, the door frame comprises at least one illumination arrangement with at least one separately switchable light source, which is configured for an animated holographic light function.

With a suitable combination, it would also be possible to display an animation or an animated (dynamically changing) holographic light function in monochrome or (multi) color or white.

This embodiment is suitable in particular when using two illumination arrangements, preferably one in a front lateral door frame section and one in a rear lateral door frame section. In this case, each illumination arrangement can comprise a plurality of separately switchable light sources. The brightness of the light source is preferably settable. In this way, special light effects and warning functions can be implemented, in particular in connection with the embodiment mentioned above.

A control device, for example in the form of an integrated circuit, can be included for the abovementioned embodiments.

In a further preferred example embodiment, the illumination arrangement and holographic door sill strip are arranged relative to one another, for the illumination of the holographic entry light, at a centroid angle which corresponds to a Brewster angle of the holographic door sill strip or deviates by less than 10°, in particular less than 5°, from the Brewster angle.

An unwanted, non-diffracted reflection at the surface of the holographic entry light can preferably be reduced by the illumination at the Brewster angle. At least one reflection of the light polarized parallel to the plane of incidence is preferably also substantially suppressed in this way in the case of unpolarized light.

If, for example, LEDs that are unpolarized are used as the light source, there is preferably a 50:50 mixture of perpendicular (TE) and parallel (TM) polarized light. At the Brewster angle, preferably 50% of the light (the TM component, i.e. the component polarized parallel to the plane of incidence) is completely not reflected but penetrates into the medium, e.g. the plastics cover of the embossed hologram described above.

The overall yield of the system, i.e. in particular the sum TE+TM, is preferably important. The angle of incidence is advantageously selected in such a way that the sum of the reflection coefficients from TE+TM is as small as possible.

At an angle of incidence (centroid angle) in the range of 0 . . . 20°, for example, 4% would be ideal. However, the light would then have to come from above, which has disadvantages regarding installation, e.g. a large distance between the illumination arrangement and the door sill strip. At a preferred angle of incidence of 70°, for example, more than 30% is reflected, which would be undesirable. The Brewster angle lies preferably in-between for unpolarized light—here at least TM would be 0%—and thus represents a good compromise for unpolarized light.

To determine the Brewster angle, air under standard conditions, in particular air in accordance with ISO 2533, can be assumed to surround the door sill strip.

In a further preferred example embodiment, the illumination arrangement is configured to illuminate the holographic structure at an angular spectrum around a centroid angle, with the result that at least 30% of the light rays from the illumination arrangement, in particular at least 40% of the light rays from the illumination arrangement, light the holographic structure, wherein an intensity distribution of the illumination light is preferably homogeneous and in particular has a ratio of minimum intensity (or minimum illuminance or irradiance) to maximum intensity (or maximum illuminance or irradiance) of greater than 0.8.

In this way, an improved holographic light function can be provided. It is often particularly desirable that the holographic structure is illuminated as homogeneously as possible, while few unwanted "light spots" are generated, or unwanted "light spots" are substantially not generated, next to the holographic structure.

In a further preferred example embodiment, the illumination arrangement has a beam-shaping component part. In this way, improved illumination can be implemented and, for example, collimation, the centroid angle, and the angular spectrum can be advantageously influenced.

In a further preferred example embodiment, the illumination arrangement has an anamorphic free-form lens as the beam-shaping component part, the shape of which preferably results from the dimensioning of the holographic structure and/or the arrangement of the illumination arrangement and the holographic entry light relative to one another.

Since the aspect ratio of door sill strips is preferably large (very long, not very wide), the beam-shaping optical unit should have anamorphic properties for high efficiency (i.e. preferably different focal lengths in the horizontal and vertical directions, i.e. in particular different curvatures in the x- and y-directions). The necessary ratio advantageously results from the hologram size and the angle at which the hologram is illuminated.

The optical unit is preferably a free-form lens which has the abovementioned anamorphic properties and does not necessarily have to have symmetries in relation to any axes.

The lens can have certain symmetries, but these can be omitted if lighting that is as homogeneous as possible is to be implemented.

In particular, such a lens can be used to ensure that at least 30% of the light rays from the illumination arrangement, in particular at least 40% of the light rays from the illumination arrangement, light the holographic structure, wherein an intensity distribution of the illumination light is preferably homogeneous and in particular has a ratio of minimum intensity (or minimum illuminance or irradiance) to maximum intensity (or maximum illuminance or irradiance) of greater than 0.8.

In a further preferred example embodiment, the illumination arrangement has a biconical lens as the beam-shaping component part, the shape of which preferably results from the dimensioning of the holographic structure and/or the arrangement of the illumination arrangement and the holographic entry light relative to one another.

The beam-shaping optical unit can be a lens, with the light output coupling side having the shape of a biconical surface.

In particular, such a lens can be used to ensure that at least 30% of the light rays from the illumination arrangement, in particular at least 40% of the light rays from the illumination arrangement, light the holographic structure, wherein an intensity distribution of the illumination light is preferably homogeneous and in particular has a ratio of minimum intensity (or minimum illuminance or irradiance) to maximum intensity (or maximum illuminance or irradiance) of greater than 0.8.

In a further preferred example embodiment, the illumination arrangement is configured for an illumination of the holographic door sill strip with an angular spectrum of less than 5°, in particular less than 2°. In this way, particularly sharp images can be generated without double images or smearing.

In a further preferred example embodiment, the illumination arrangement comprises at least one polarized light source, preferably at least one laser or at least one LED with a polarization filter, wherein the polarization of the light emitted by the light source is preferably polarized substantially parallel to the plane of incidence. Illumination is preferably carried out at a Brewster angle. This can further reduce unwanted reflections.

In a further preferred example embodiment, the light source of the illumination arrangement comprises at least one LED, in particular at least one predominantly unpolarized LED. This embodiment is particularly cost-effective and powerful.

In a further preferred example embodiment, the light source of the illumination arrangement comprises at least one monochromatic light source which emits light substantially in one color spectrum.

In a further preferred example embodiment, the light source of the illumination arrangement comprises at least one multicolored light source and/or a plurality of monochromatic light sources each having a different color, so that light in more than one color spectrum is emitted. So white light can be realized e.g. with a combination of a red (R), a green (G), and a blue light source (B).

In a further preferred example embodiment, the light source of the illumination arrangement comprises red, green, and blue light. This is a source of white light that is particularly easy to implement and can be mass-produced.

In a further preferred example embodiment, the light source of the illumination arrangement comprises white light. This is a particularly material-saving implementation of a source of white light.

In a further preferred example embodiment, the holographic door sill strip and/or the holographic structure has a rectangular shape along the planar extent, in particular with a long and a short side. Such a door sill strip has a particularly aesthetic effect and is particularly well suited for the holographic display of lettering.

In a further preferred example embodiment, the at least one holographic structure is configured to generate at least one holographic light function for at least some of the spectral range emitted by the light source, wherein different holographic structures are preferably used for different spectral ranges. A multispectral light function with improved optical quality can thus be provided.

In a further preferred example embodiment, a plurality of differently colored light sources are arranged one above the other in the lateral door frame section, and the at least one holographic structure is configured to generate the light function of the respective light source with the respective color and/or at the respective illumination angle. A particularly narrow illumination arrangement can thus be implemented. The illumination angle preferably corresponds to the centroid angle.

In a further preferred example embodiment, the illumination arrangement is configured to illuminate the holographic structure with an intensity profile, in particular from the center to the periphery and/or along a long and/or short side of the planar holographic structure.

For example, an intensity drop toward a peripheral region and/or a central region of the holographic structure can be implemented.

Intensity curves within or through the holographic structure can be controlled, firstly, by varying the efficiency of the holographic structure. For example, there may be a variation from 100% (all light is coupled out) to 50% (half the light is coupled out). In this case, however, some of the light which illuminates the holographic structure "is" not used because it is not diffracted. In addition, the illumination arrangement can be configured to light the holographic structure with an intensity profile. For example, the holographic structure is illuminated inhomogeneously (e.g. from 100% to 50% intensity) on account of suitable beam-shaping. In that case the holographic structure preferably has an efficiency of 100% throughout, which is to say all of the light is diffracted (if the zero order, for example, is ignored). With this embodiment, which is geared toward illumination with an intensity profile, a defined intensity profile can be demanded and, at the same time, the efficiency can be maximized. At the same time, special light functions can be generated in this way.

In a further preferred example embodiment, the illumination arrangement has no beam-shaping component part, wherein the light source having at least one LED with an emitter surface up to a size of 1 mm×1 mm. This is a particularly simple embodiment with a still good lighting and optical quality overall.

In a further preferred example embodiment, the field of view is arranged so that the holographic light function can be seen by the driver, the front passenger, a person entering the vehicle, and/or a person exiting the vehicle. The effect of the door sill strip can be particularly high due to the good visibility of the holographic light function.

In particular, a plurality of fields of vision are encompassed, e.g. for the visibility of the holographic light function by the driver, the front passenger, a person entering the vehicle and/or a person exiting the vehicle. Different motifs can also be displayed for different fields of view, e.g. by various holographic structures, e.g. in a stack or with a multiplex hologram.

In a further preferred example embodiment, the door frame and the illumination arrangement are configured to switch on the light source when the door is open and switch off the light source when the door is closed. This can be implemented, for example, with the aid of sensors and an integrated circuit. This increases efficiency and improves the service life of the illumination arrangement.

In a further preferred example embodiment, the illumination arrangement and/or the holographic door sill strip has a dirt protection element protecting against dirt when the door is closed, in particular a rubber lip and/or a rubber apron, which at least partially covers the illumination arrangement and/or the holographic door sill strip when the door is closed. The rubber lip and/or rubber apron are preferably designed in such a way that they cover the illumination arrangement and/or the holographic door sill strip in a dirt-tight manner when the door is closed, but release it when the door is open. This embodiment requires particularly little maintenance.

When opening, the rubber lip or the rubber apron can preferably "wipe" over the illumination arrangement and/or the holographic door sill strip and thus achieve cleaning.

In a further preferred example embodiment, the surface of the holographic door sill strip and/or of the illumination arrangement is configured for a lotus effect against soiling of the surface.

The lotus effect preferably refers to the property of a low wettability of a surface, as in known from the lotus plant. This can be achieved, for example, by water-repellent micro- and/or nanostructured surfaces. As a result, reduced maintenance and a long service life can be achieved.

Further provided a holographic door sill strip configured for use in a door frame as described in this document.

The advantages, definitions, and embodiments of the door frame according to the invention also apply to the claimed door sill strip according to the invention.

Also provided is a system made up of a holographic door sill strip and an illumination arrangement, configured for use in a door frame as described in this document.

The advantages, definitions, and embodiments of the door frame according to the invention and/or of the door sill strip according to the invention also apply to the claimed system according to the invention.

BRIEF DESCRIPTION OF THE DRAWINGS

The invention will be explained below with reference to further figures and examples. The examples and figures serve for illustrating a preferred embodiment of the invention without limiting the latter.

The door sill strip is visible only when the door is opened.

The door frame and door sill strip are always static with respect to each other-only the door moves relative to the two.

One or more LEDs with (or without) a suitable beam-shaping optical unit should be able to be accommodated in the door frame. The beam-shaping optical unit should be adapted in such a way that the hologram is lit as optimally as possible. If these LEDs are then RGB, white light is incident on the hologram, and the hologram can reproduce a white motif.

The eyebox of the hologram can be aimed at the driver or front passenger or at a person located outside the vehicle (person standing in front of the door).

The LEDs may only come on when the door is opened.

In order to be able to display a white motif holographically, the holographic structure must be designed for at least 3 colors as an RGB hologram.

In order to enable a floating height (i.e. the holographic motif is intended to float a few cm above the actual door sill strip) and at the same time enable a clean motif display, a defined lighting of the hologram is required.

The current installation space (3 mm installation depth) does not provide such space for complex lighting within the door sill strip.

LEDs for illumination are located in the door frame.

The LEDs can be monochromatic, RGB LEDs, or white LEDs.

The arrangement can comprise a monochromatic LED or a plurality of monochromatic LEDs, an RGB LED, or a white LED in order to display a plurality of colors or the color white as well.

The LEDs are arranged in such a way that the hologram is preferably lit at an angle that corresponds to the Brewster angle $\vartheta_B$ (alternatively $\vartheta_B \pm 5°$ or $\vartheta_B + 10°$). ($\rightarrow$Centroid angle). This arrangement is advantageous for the exposure of the holograms, as it allows disturbing reflections to be minimized (and the maximum amount of light to penetrate the hologram material).

A plurality of LEDs being arranged vertically results in different centroid angles for the holograms (e.g. $\vartheta_R$, $\vartheta_G$, $\vartheta_B$). The holograms are each designed in such a way that they reconstruct as efficiently as possible at this centroid angle. The use of reflection holograms is advantageous in order to enable a floating height of the hologram motif and at the same time a clean display, since the strong filter effect is inherent in reflection holograms. Attention needs to be paid only to a clean, defined reference illumination.

Figure 1:
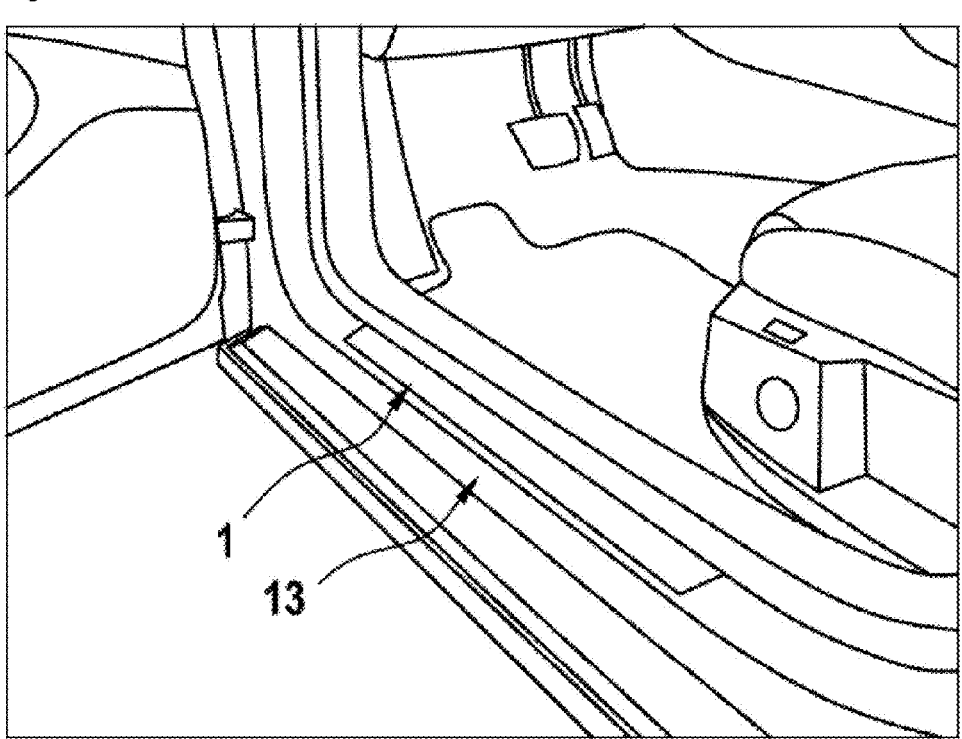

FIG. 1 shows a front entry region of a passenger vehicle with a door sill strip.

Figure 2:
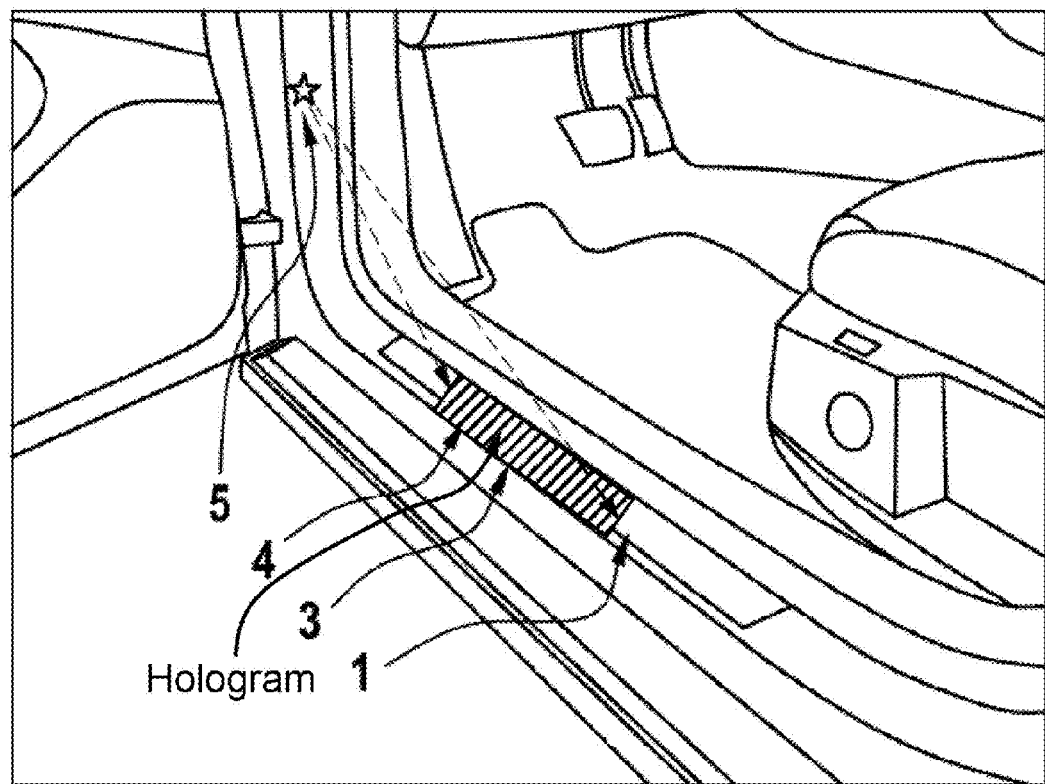

FIG. 2 shows a front entry region of a passenger vehicle with an illuminated holographic door sill strip.

Figure 3:
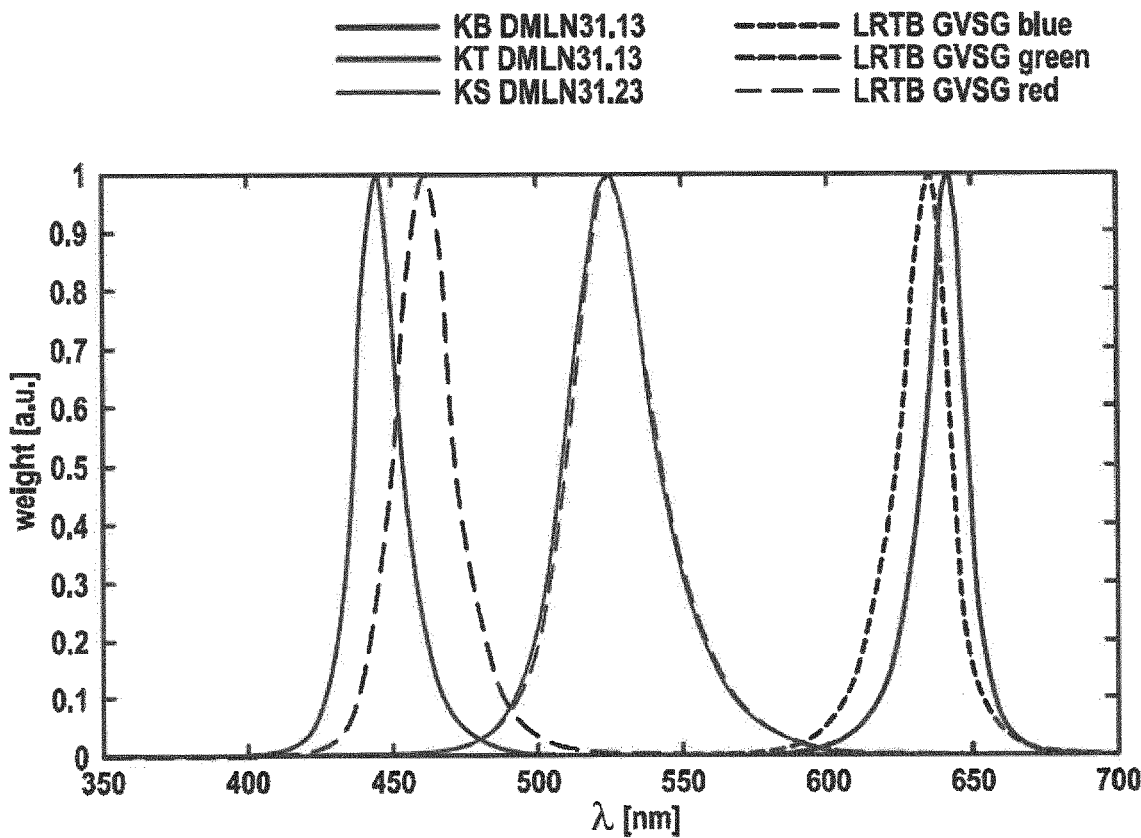

FIG. 3 shows the spectrum of an illumination arrangement with a typical RGB LED light source.

11

12

Figure 4:
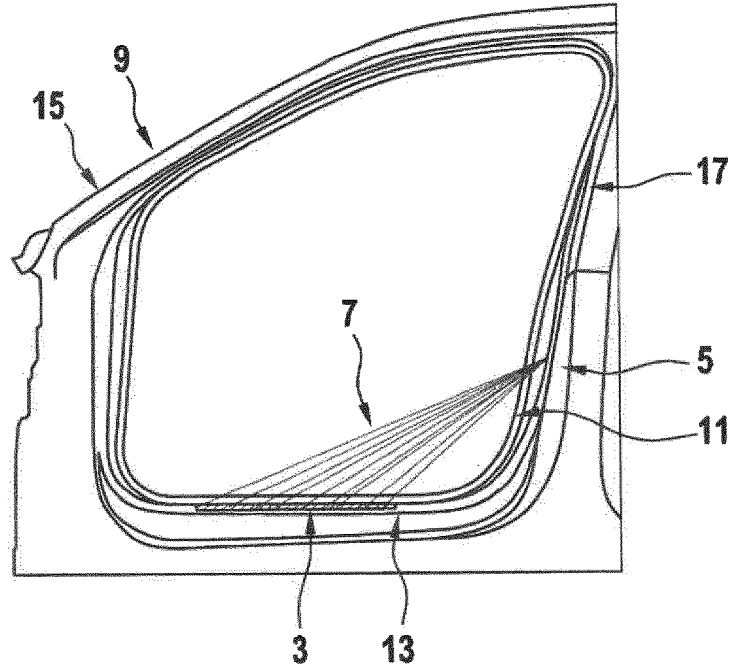

FIG. 4 shows the basic structure of a door frame with an illumination arrangement without any beam-shaping component part.

Figure 5:
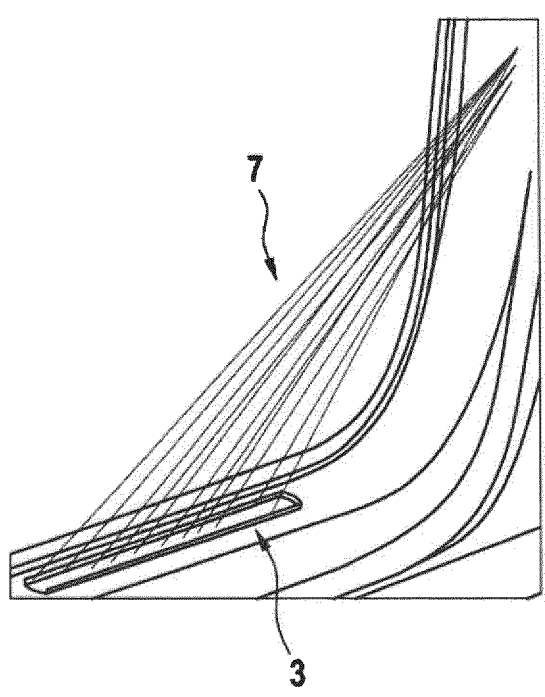

FIG. 5 shows a detailed view of the light rays from the illumination arrangement without any beam-shaping component part, and the illuminated reflective holographic structure.

Figure 6:
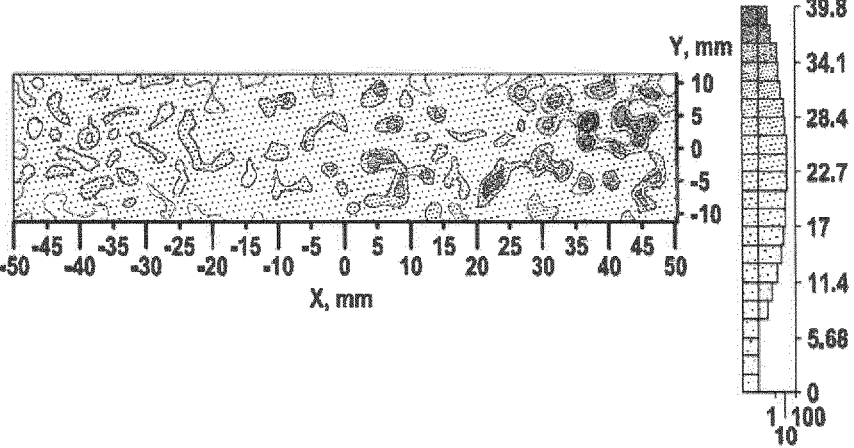

FIG. 6 shows an intensity distribution (illuminance) of the illumination rays on the holographic structure in an illumination arrangement without any beam-shaping component part.

Figure 7:
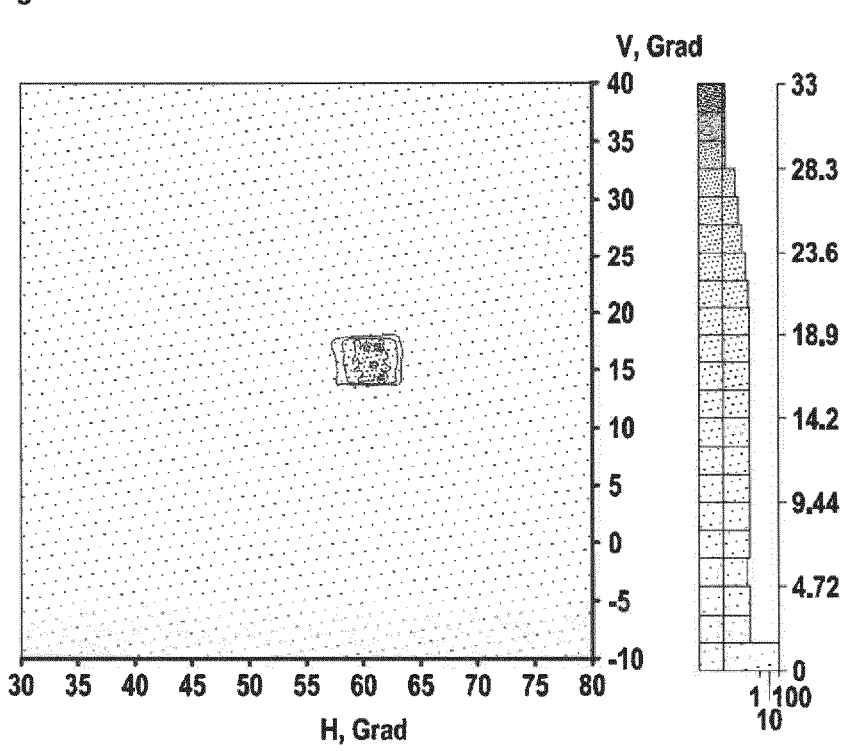

FIG. 7 shows the angular spectrum (luminous intensity) of the illumination of the reflective holographic structure in an illumination arrangement without any beam-shaping component part.

Figure 8:
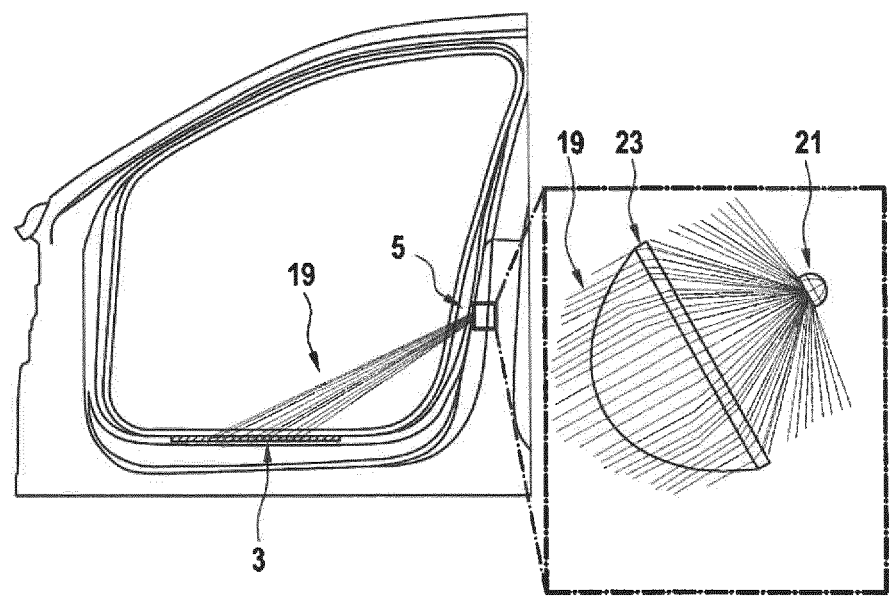

FIG. 8 shows the basic structure of a door frame with an illumination arrangement with a beam-shaping component part, and a section with an enlargement of the illumination arrangement.

Figure 9:
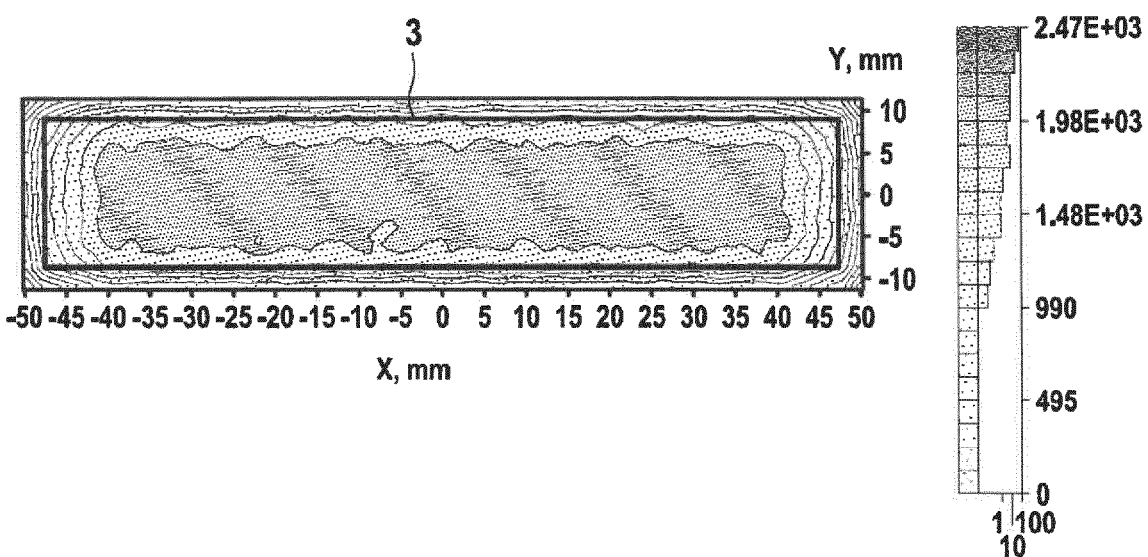

FIG. 9 shows an intensity distribution (illuminance) of the illumination rays on and directly next to the holographic structure in an illumination arrangement with a beam-shaping component part.

Figure 10:
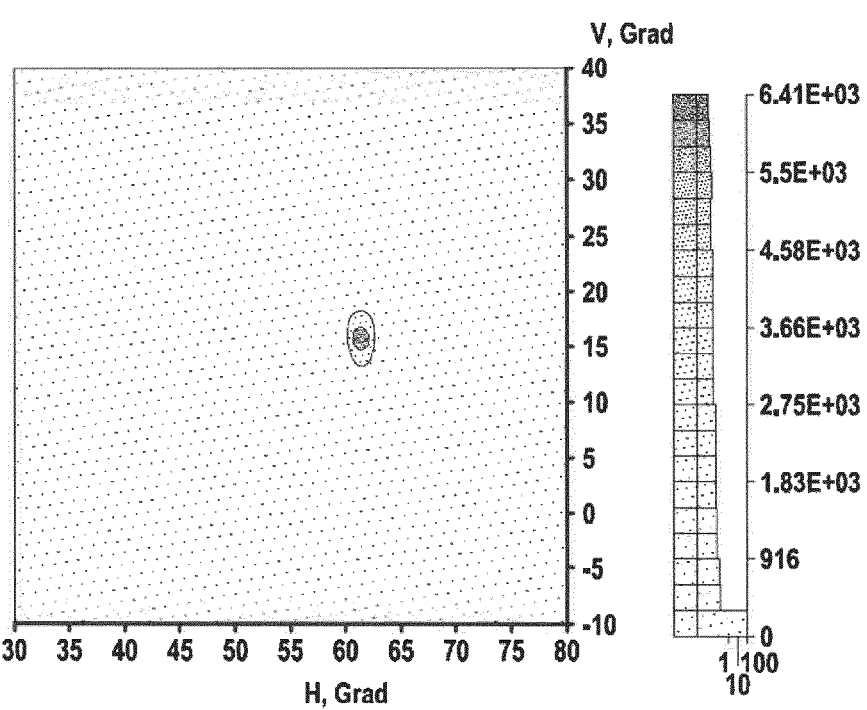

FIG. 10 shows the angular spectrum of the illumination (luminous intensity) of the reflective holographic structure in an illumination arrangement with a beam-shaping component part.

Figure 11:
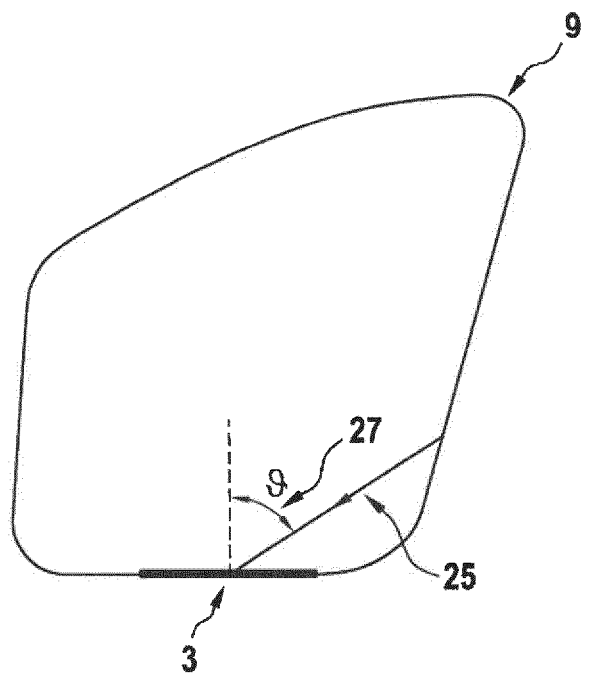

FIG. 11 shows schematically the illumination of the holographic structure at a suitable centroid angle.

Figure 12:
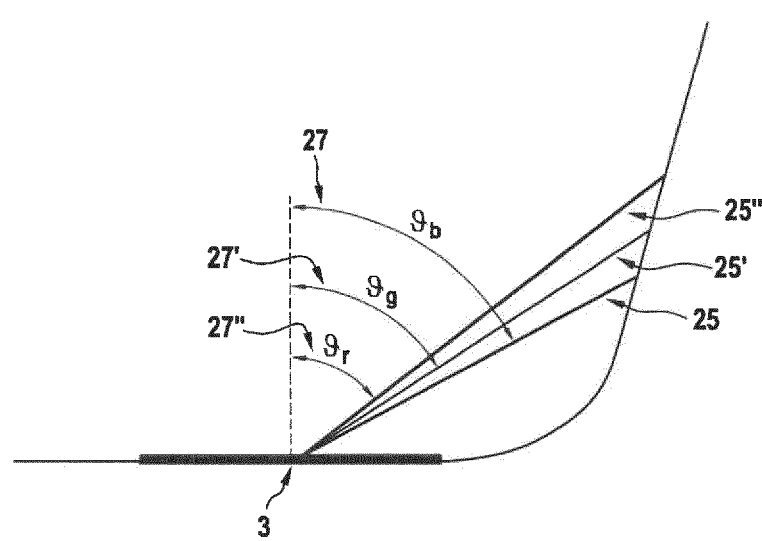

FIG. 12 shows schematically the illumination of the holographic structure in an illumination arrangement with multiple RGB light sources one above the other, which illuminate the holographic structure at a suitable centroid angle.

Figure 13:
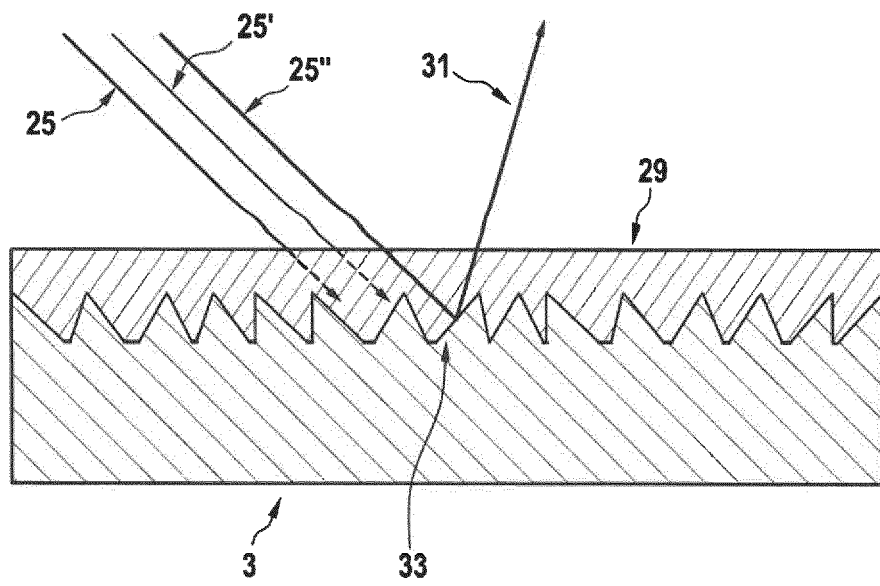

FIG. 13 shows the holographic structure as an embossed hologram with a red cover, which substantially only does not absorb the red light of a varicolored spectrum.

DETAILED DESCRIPTION

FIG. 1 shows a front entry region of a passenger vehicle with a door sill strip 1 in a lower door frame section 13.

FIG. 2 shows a front entry region of a passenger vehicle with an illuminated holographic door sill strip 1 having a holographic structure 3. The holographic light function 4 is generated when illuminated by the illumination arrangement 5, which is accommodated in a front lateral door frame section. The holographic light function 4 can be text, which floats above the door sill strip 1.

FIG. 3 shows the spectrum of an illumination arrangement with a typical RGB LED light source. The following well-suited LEDs are shown:

Monochrome LEDs:

Osram Synios P2720

KS DMLN31.23 (super red, λdom=632 nm, φ=25 lm)

KT DMLN31.23 (true green, λdom=528 nm, φ=25 lm

B DMLN31.13 (blue, λdom=455 nm, =10 lm)

"RGB" LED Combination:

Osram MultiLED LRTB GVSG

LRTB GVSG red (λdom=625 nm, φ=2.01 lm)

LRTB GVSG green (λdom=528 nm, φ=4.48 lm)

LRTB GVSG blue (λdom=460 nm, φ=0.92 lm)

The "white light" LED, which is also suitable, is not shown:

Osram Synios P2720

KW DMLN32 SB

FIG. 4 shows the basic structure of a door frame 9 with an illumination arrangement 5 without any beam-shaping component part. The door frame has an A-pillar 15 and a B-pillar 17. The holographic structure 3 is located in the lower door frame section 13 and is illuminated at an angle with the light rays from the illumination arrangement 5 without any beam-shaping component part 7. The illumination arrangement is located in the rear lateral door frame section 11, which is a part of the B-pillar 17 because it is a front door.

FIG. 5 shows a detailed view of the light rays from the illumination arrangement without any beam-shaping component part 7, and the illuminated reflective holographic structure 3.

FIG. 6 shows an intensity distribution (illuminance) of the illumination rays on the holographic structure in an illumination arrangement without any beam-shaping component part. The unit is lux [lx], the scale ranges from 0 lx to 39.8 lx. It can be seen that the lighting is very homogeneous.

FIG. 7 shows the angular spectrum of the illumination (the light intensity is shown as a function of the horizontal or vertical angle) of the reflective holographic structure in an illumination arrangement without any beam-shaping component part. The angular spectrum is not very large, although no beam-shaping component part is used.

FIG. 8 shows the basic structure of a door frame 9 with an illumination arrangement 5 with a beam-shaping component part 23, and a section with an enlargement of the illumination arrangement 5. It can be seen that the light rays from the illumination arrangement with a beam-shaping component part 19 are aligned optimally onto the holographic structure 3. In particular, this can be achieved by using an anamorphic (free-form) lens, arranged downstream of the light source 21 (here an LED), as a beam-shaping component part 23, which is optimally shaped in relation to the requirements.

FIG. 9 shows an intensity distribution (illuminance) of the illumination rays on and directly next to the holographic structure 3 in an illumination arrangement with a beam-shaping component part. It can be seen both that the homogeneity lies in the range described above and that substantially only the holographic structure 3 (to at least 40% based on the total illumination intensity) is illuminated. The extension shown runs in the x-direction (horizontal axis) from −50 mm to +50 mm and in the y-direction (vertical) from −10 mm to +10 mm. The intensity scale (cd) shown ranges from 0 to $2.47 \times 10^3$ cd.

FIG. 10 shows the angular spectrum of the illumination (the light intensity is shown as a function of the horizontal or vertical angle) of the reflective holographic structure in an illumination arrangement with a beam-shaping component part. The angular spectrum is even smaller than without the use of the beam-shaping component part.

FIG. 11 shows schematically the door frame 9 with illumination of the holographic structure 3 along an illumination direction 25 at a suitable centroid angle 27.

FIG. 12 shows schematically the illumination of the holographic structure 3 in an illumination arrangement 5 with a plurality of RGB light sources one above the other, which illuminate the holographic structure along a respective illumination direction 25 (blue), 25' (green) and 25" (red) at a suitable centroid angle 27 (blue), 27' (green) and 27" (red).

FIG. 13 shows the holographic structure 3 as an embossed hologram 33 with a red cover 29 (the color is illustrated in the image by diagonal hatching from the bottom left to the top right). Daylight or ambient light covers a wide spectrum, including blue along one illumination direction 25, green along one illumination direction 25' and red along one illumination direction 25". Of course, daylight or ambient light also comprises other illumination directions, which, however, are not diffracted or are diffracted differently than the one shown. The light ray 31 that is not absorbed by the cover and is diffracted by the hologram in the example shown is only the red light desired, which generates the holographic light function.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

LIST OF REFERENCE SIGNS

1 Door sill strip
3 Reflective holographic structure
4 Holographic light function
5 Illumination arrangement
7 Light rays from the illumination arrangement without any beam-shaping component part
9 Door frame
11 Rear lateral door frame section
13 Lower door frame section
15 A-pillar
17 B-pillar
19 Light rays from the illumination arrangement with a beam-shaping component part
21 Light source (LED)
23 Beam-shaping component part
25 Illumination direction (radiation main direction)
27 Centroid angle of the illumination
29 Red cover of an embossed hologram
31 Light ray that is not absorbed by the cover and is diffracted by the hologram
33 Embossed hologram

The invention claimed is:

1. A door frame for a vehicle, comprising:
a holographic door sill strip disposed in a lower door frame section;
an illumination arrangement that is arranged in at least one lateral door frame section and is configured to illuminate the holographic door sill strip, the illumination arrangement comprising at least one light source,
wherein the holographic door sill strip comprises a planar element having a thickness perpendicular to a planar extent of at most 3 mm, which includes at least one planar, reflective holographic structure that is configured to generate a holographic light function in a field of view,
wherein the holographic structure is configured to generate the holographic light function when illuminated by the illumination arrangement, and
wherein the illumination arrangement and the holographic door sill strip are arranged relative to one another for the illumination of the holographic structure at a centroid angle which is within 10° of a Brewster angle of the holographic door sill strip.

2. The door frame of claim 1, wherein the holographic structure comprises a volume hologram.

3. The door frame of claim 1, wherein the holographic structure comprises an embossed hologram, a hologram stack or a multiplexed hologram.

4. The door frame of claim 1, wherein the holographic structure comprises an embossed hologram, which is included in an element which is configured to predominantly absorb a part of the visible spectrum that is not intended to contribute to the generation of the holographic light function.

5. The door frame of claim 1, wherein the holographic structure is an embossed hologram, is configured to generate the holographic light function when illuminated by daylight and/or ambient light in at least a portion of a range from 420 nm to 700 nm.

6. The door frame of claim 1,
wherein the lateral door frame section is a front lateral door frame section, an extension of an A-pillar toward the vehicle floor or a lower section of the B-pillar, and/or
wherein the lateral door frame section is a rear lateral door frame section, a lower section of a B-pillar toward the vehicle floor or an extension of a C-pillar toward the vehicle floor.

7. The door frame of claim 6, wherein two illumination arrangements are provided, in each case in a front lateral door frame section and a rear lateral door frame section.

8. The door frame of claim 1, wherein the illumination arrangement is configured to illuminate the holographic structure with an angular spectrum around a centroid angle, with the result that at least 30% of the light rays from the illumination arrangement light the holographic structure, and
wherein an intensity distribution of the illumination light is homogeneous and has a ratio of minimum intensity to maximum intensity of greater than 0.8.

9. The door frame of claim 1, wherein the illumination arrangement includes an anamorphic free-form lens as the beam-shaping component part, wherein the anamorphic free-form lens has a shape produced from dimensioning of the holographic structure and/or the arrangement of the illumination arrangement and the holographic structure relative to one another.

10. The door frame of claim 1, wherein the illumination arrangement includes a biconical lens as the beam-shaping component part, wherein the beam-shaping component part has a shape produced from dimensioning of the holographic structure and/or the arrangement of the illumination arrangement and the holographic structure relative to one another.

11. The door frame of claim 1, wherein the light source of the illumination arrangement comprises at least one multi-colored light source and/or a plurality of monochromatic light sources, each having a different color, so that light in more than one color spectrum is emitted.

12. The door frame of claim 11, wherein the light source of the illumination arrangement comprises red, green, and blue light.

13. The door frame of claim 1, wherein the at least one holographic structure is configured to generate at least one holographic light function for at least some of a spectral range emitted by the light source, wherein different ones of the at least one holographic structure are preferably used for different spectral ranges.

14. The door frame of claim 1, wherein a plurality of differently colored light sources are arranged one above the other in the lateral door frame section and the at least one holographic structure is configured to generate the holographic light function of the respective light source with a respective color and/or at a respective illumination angle.

15. The door frame of claim 1, wherein a field of view is arranged so that the holographic light function can be seen by a driver of the vehicle, a front passenger of the vehicle, a person entering the vehicle, and/or a person exiting the vehicle.

16. The door frame of claim 1, wherein the illumination arrangement and/or the holographic door sill strip has a dirt protection element protecting against dirt when the door is closed, wherein the dirt protection element comprises a rubber lip and/or a rubber apron, which at least partially covers the illumination arrangement and/or the holographic door sill strip when the door is closed, and/or wherein the surface of the holographic door sill strip is configured for a lotus effect against soiling of the surface.

17. A holographic door sill strip for a door frame for a vehicle, wherein an illumination arrangement is arranged in at least one lateral door frame section and is configured to illuminate the holographic door sill strip, the illumination arrangement comprising at least one light source, the holographic door sill strip comprising:

a planar element having a thickness perpendicular to a planar extent of at most 3 mm, which includes at least one planar, reflective holographic structure that is configured to generate a holographic light function in a field of view, wherein the holographic structure is configured to generate the holographic light function when illuminated by the illumination arrangement, and wherein the illumination arrangement and the holographic door sill strip are arranged relative to one another for the illumination of the holographic structure at a centroid angle which is within 10° of a Brewster angle of the holographic door sill strip.

18. A system, comprising:

a holographic door sill strip, comprising a planar element having a thickness perpendicular to a planar extent of at most 3 mm, which includes at least one planar, holographic structure that is configured to generate a holographic light function in a field of view; and an illumination arrangement configured to illuminate the holographic door sill strip, comprising at least one light source, wherein the holographic structure is configured to generate the holographic light function when illuminated by the illumination arrangement, and wherein the illumination arrangement and the holographic door sill strip are arranged relative to one another for the illumination of the holographic structure at a centroid angle which is within 10° of a Brewster angle of the holographic door sill strip.

19. A holographic door sill strip for a door frame for a vehicle, wherein an illumination arrangement is arranged in at least one lateral door frame section and is configured to illuminate the holographic door sill strip, the illumination arrangement comprising at least one light source, the holographic door sill strip comprising:

a planar element having a thickness perpendicular to a planar extent of at most 3 mm, which includes at least one planar, reflective holographic structure that is configured to generate a holographic light function in a field of view, wherein the holographic structure is configured to generate the holographic light function when illuminated by the illumination arrangement, and wherein the illumination arrangement is configured to illuminate the holographic structure with an angular spectrum around a centroid angle, with the result that at least 30% of the light rays from the illumination arrangement light the holographic structure, and wherein an intensity distribution of the illumination light is homogeneous and has a ratio of minimum intensity to maximum intensity of greater than 0.8.

* * * * *